L. FAGIN.
Hanging Millstones.
No. 59,201.
Patented Oct. 30, 1866.
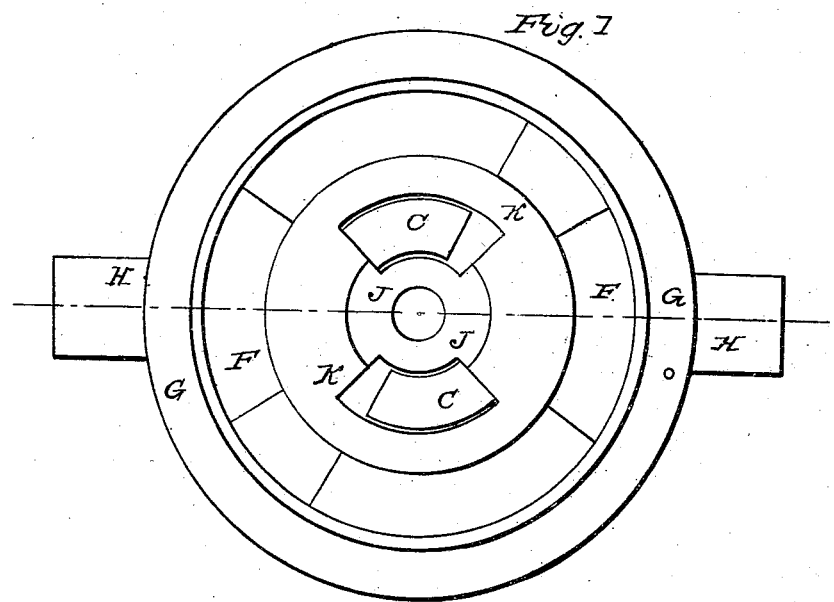
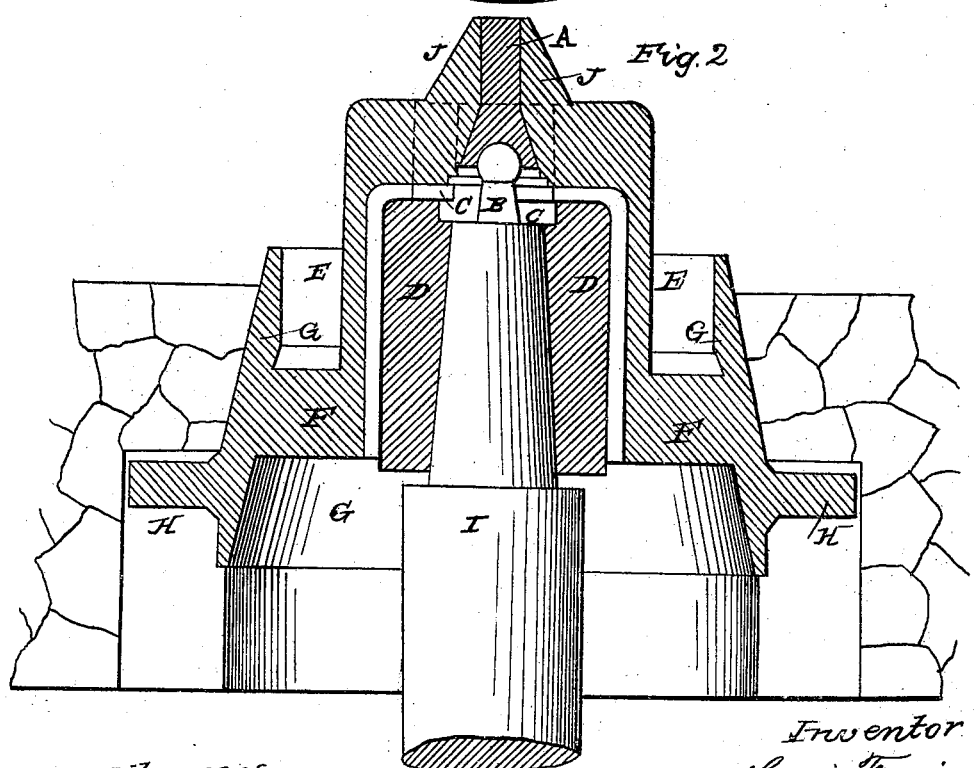

UNITED STATES PATENT OFFICE.

LEWIS FAGIN, OF CINCINNATI, OHIO.

IMPROVEMENT IN HANGING MILLSTONES.

Specification forming part of Letters Patent No. 59,201, dated October 30, 1866.

*To all whom it may concern:*

Be it known that I, LEWIS FAGIN, of Cincinnati, in the county of Hamilton and State of Ohio, have made a new and useful Improvement in Hanging Millstones; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a plan view. Fig. 2 is a vertical section on the line *a b*, Fig. 1.

The improvement consists in the mode of balancing the stone upon the cock-head, so that the point of contact between the cockhead and the cockeye is midway of the vertical height of the bearing of the driver in the slot of the balance-rynd, the stone being thereby practically self-tramming.

The piece which projects above the other irons is so shaped as to sustain the cockeye in its proper position and relation to the driving-lugs.

A is the cockeye, by which the stone is suspended. J J represent a conical-shaped part of the irons projecting entirely above every other part, for the twofold purpose of sustaining the cockeye in its proper position, as well as its proper relation to the driving-lugs C C, and at the same time allows of the openings K K, which present driving-surfaces, which are as much above as below the point of balance, and through which openings the driving-lugs C C pass and are brought to bear, and by means of which the stone is driven.

E, F, and G constitute the body and arms of the balance-rynd, and H the lugs that connect the balance-rynd with the stone.

B is the cock-head, upon which the stone is balanced. I is the spindle, and D D the driver that slips over the upper end of the spindle and is connected therewith by three (3) grooves in the drivers and the three (3) feathers in the spindle, which form driving-connections.

It will be seen that the lugs C C on the drivers have a certain amount of vertical bearing against the slots in the balance-rynd, through which they project, and that the cock-head is precisely midway of the vertical length of the said bearing.

It will also be seen that the driving-lugs C C and the surfaces against which they bear are brought to view, so that the face of the lugs or bearings can be filed or fitted to a perfect bearing; whereas in ordinary mill-irons the driving-points, when the stone is down, are out of view, and hence the great labor and uncertainty in getting a proper fit and drive, even when the spindle is in proper tram; and it will also be observed that in all cases where the balancing-point is some distance above the point of driving, as is the case with all ordinary balance-rynds, the moment the spindle is out of tram the driving is imperfect—that is, one end of the driver is thrown on and the other off from its proper bearings—and the consequence is uneven grinding; whereas it it will be observed that, with the balancing-point and driving-points arranged as herein specified, the driving is perfect under any and all circumstances, for the relation that the point of balance sustains to the driving-points causes it to act like a universal joint; hence the driving is as perfect with the spindle out of tram as if in tram.

What I claim is—

1. The arrangement of the cockeye A, cockhead B, openings K in the balance-rynd, and driving-lugs C C, by which the point of balance is adjusted, as described, and for the purpose set forth.

2. The construction of the balance-rynd with openings K K, by means of which the driving-lugs and driving-surfaces are brought to view and rendered accessible for the purpose of fitting.

LEWIS FAGIN.

Witnesses:
J. BARTHOLOMEW,
HENRY HILL.